Figure 1:
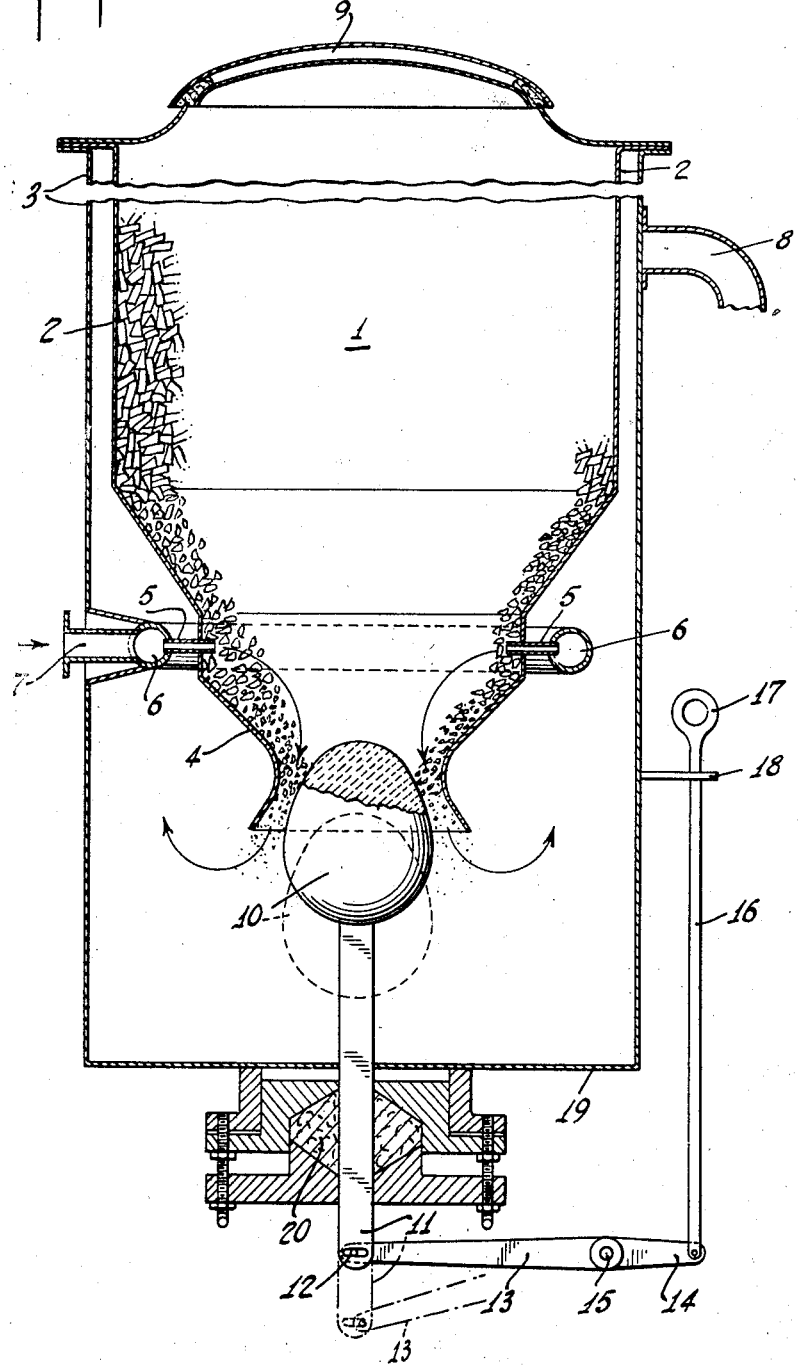

Jan. 19, 1943.  F. HUBER ET AL  2,308,921
GAS PRODUCER FOR VEHICLES AND TRACTORS
Filed April 24, 1941  2 Sheets-Sheet 1

INVENTOR
FRITZ HUBER
KARL KÜNZEL
BY
ATTORNEY

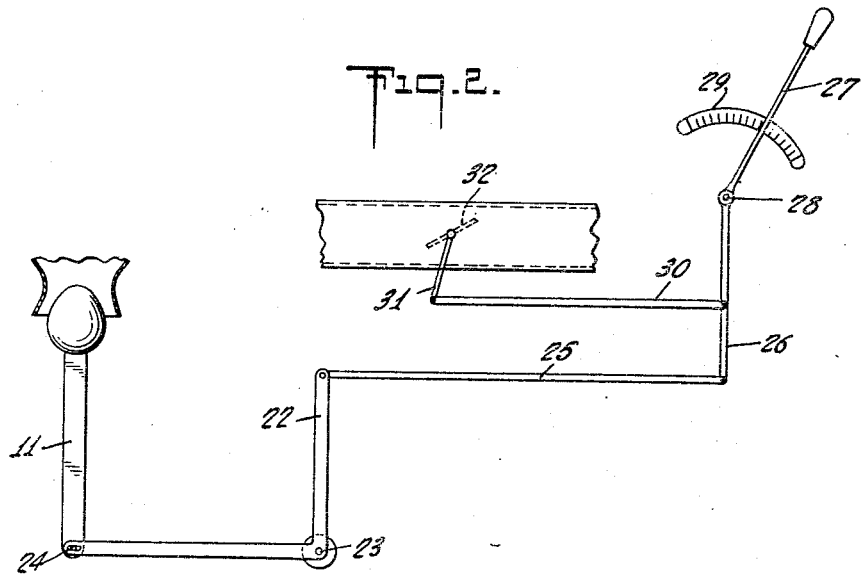
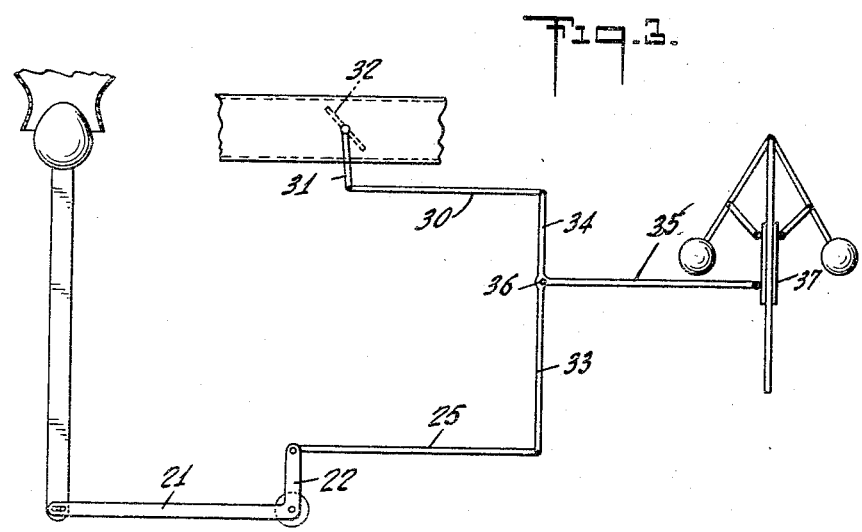
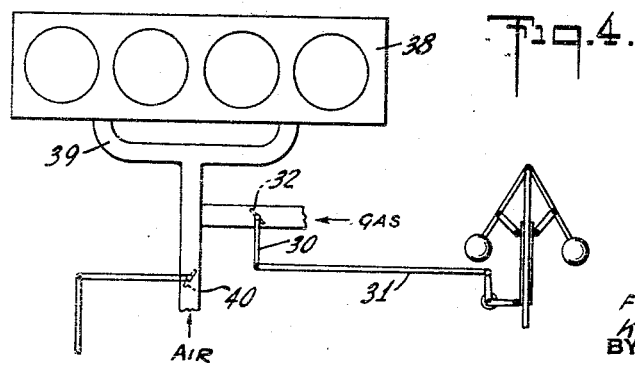
INVENTOR
FRITZ HUBER
KARL KÜNZEL
BY Karl A. Mayr
ATTORNEY Patented Jan. 19, 1943

2,308,921

UNITED STATES PATENT OFFICE 2,308,921

GAS PRODUCER FOR VEHICLES AND TRACTORS

Fritz Huber and Karl Künzel, Mannheim, Germany; vested in the Alien Property Custodian Application April 24, 1941, Serial No. 390,120
In Germany March 23, 1940

5 Claims. (Cl. 123—3)

This invention relates to a gas producer for vehicles and tractors, especially to a gas producer with a shaft tapered at its lower end, this tapered end forming the hearth for the production of the gas, with nozzles for the admission of the air, these nozzles being mounted on the outer circumference of the hearth and the air flowing through the hearth from the outer side inwards and from the top downwards, for the gasifying of wood, charcoal and similar fuels.

A chief object of the invention is, to provide in the gas producer hearth an arrangement, by means of which the fuel in the hearth and above the hearth is supported. In gas producers of this type the danger exists that the bed of fuel, especially the bed of charcoal, is shaken at strong concussions as often occur in the vehicle service so that the charcoal is broken.

Another object of the invention is, to construct the arrangement for supporting the bed of fuel so that the size of the inner cross-section of the gas producer hearth is adapted to the actual loading of the driving engine and, with this object in view, can be enlarged or reduced. The most essential condition for a power engine for driving a vehicle, especially for the traffic on roads and for a service exposed to considerable fluctuations of loading, for example in agriculture, is a rapid and perfect capability of adaptation to the different steps of loading. Such a machine must be capable to run, for instance at idle running or at running under little load, not only a few minutes but permanently, without any disturbance. Gas producers are frequently used in the vehicle service; it is, however, known, that such machines cannot long be operated at idle running, as otherwise the gas becomes bad. The gas producer becomes then too cool, and an undesired tar formation takes place for instance when gas from wood is used.

Another object of the invention is to provide in the hearth of a gas producer an arrangement, in which a considerable quantity of heat can be accumulated which, at fluctuations of loading causes a rapid equalisation of temperature.

According to the invention a simple and effective means is provided to obviate the existing difficulties and inconveniences. With this object in view, the arrangement according to the invention consists of a piston which is arranged in the gas producer hearth. The piston is preferably pear-shaped so that it does not unfavourably influence the flow of the gas. The piston has further preferably no hollow space and consists of a heat-accumulating, for instance ceramic material, in order that the greatest possible quantity of heat can be accumulated. The piston is preferably arranged underneath the narrowest cross-section of the gas producer hearth.

The invention provides further, that the piston is fixed on a piston rod by means of which the position of the piston in the gas producer can be altered. The arrangement is preferably such, that the piston can be shifted by means of the piston rod during the service.

According to the invention the piston rod is further connected with rods for shifting the piston, these rods being connected, in turn, with a regulating lever, by which the adjusting can take place, for instance by hand. The rods however, may also be connected with the regulating lever or with the centrifugal governor of the driving engine.

Other objects and advantages of the invention and details of the arrangement according to the invention will be disclosed by the following specification and the drawings to which this specification refers.

Three embodiments of the invention are illustrated by way of example in the accompanying drawings, in which Fig. 1 shows the gas producer in vertical section, Figs. 2 and 3 show each a modification of the connection between the piston rod and the throttle flap, Fig. 4 shows the arrangement of the throttle flap on the driving engine.

With reference to Fig. 1, the gas producer has an inner jacket 2 forming the shaft for the fuel and an outer jacket 3. The inner jacket 2 is narrowed at its lower end, this narrowed portion forming the hearth 4 of the gas producer 1. Nozzles 5 for the admission of air are mounted on the outer circumference of the hearth 4. These nozzles 5 are connected to a distributor 6, into which the air is sucked from the outer side through an air admission aperture 7. The air flows therefore from the outer side inwards and from the top downwards through the hearth 4, as indicated by the arrows. The combustible gas is discharged at the lower end of the hearth in the direction of the arrows and from the gas producer through the outlet 8. The gas producer 1 is closed at its upper end by a lid 9, through which the fuel is introduced. In the free cross-section of the hearth 4 a piston 10 is arranged, by which the fuel bed, especially the sensitive layer of charcoal in which the reduction of the gas takes place, is supported, so that this fuel bed or the layer of charcoal can withstand also the strongest shaking.

By shifting the piston not only the size of the cross-section of the hearth can be adapted to the different conditions of service or of loading, that is can be enlarged or reduced, but one and the same gas producer can also be employed for power engines of different sizes without the necessity to alter, as has been necessary up to the present, the cross-section of the hearth by hearth inserts of different dimensions. In the displacer piston made of solid material a large quantity of heat can further be accumulated, which at fluctuations of loading causes a rapid equalisation of temperature. The piston 10 is connected with the piston rod 11 by means of which it can be shifted. With this object in view, the arm 13 of a two-armed lever 13, 14 oscillatable about a pin 15 and having a slit guide 12 engages over the lower end of the piston rod 11, the other arm 14 of said two-armed lever being connected with the regulating lever 16 which has a handle 17 and is mounted in a guide 18 on the gas producer 1. The piston rod 11 itself extends from below through the bottom 19 of the gas producer 1 and moves in a tight guide 20 fixed on the bottom 19.

In the embodiment shown in Fig. 2, the two armed lever connected with the lower end of the piston rod 11 is an elbow lever 21, 22 oscillatable about a stationary pivot pin 23, the arm 21 of said elbow lever being connected by a slit guide 24 with the lower end of the piston rod 11, the other arm 22 being connected with the control rod 25. This control rod 25 in turn engages on an arm 26 of a two-armed lever 26, 17 oscillatable about a fixed pin 28. The arm 27 of the lever 26, 27 is constructed as regulating lever and adjustable on a scale 29. Control rods 30 and 31 engage on the arm 26, the control rod 31 being connected with a throttle flap 32 which is arranged in the gas or air conduit leading to the driving engine.

In the embodiment shown in Fig. 3, the control rod 25 connected with the two-armed lever 21, 22 engages on arm 33 of an elbow lever 33, 34, 35, this elbow lever being oscillatable about a fixed pin 36. The arm 34 of this lever is, as in the form of construction shown in Fig. 2, connected with the throttle flap 32 by means of the control rods 30 and 31. The arm 35 of lever 33, 34, 35 is connected with a centrifugal regulator 37, which effects the adjusting of this lever and therewith also, by means of the said connecting rods, the adjusting of the piston 10 and of the throttle flap 32.

Fig. 4 shows how the throttle flap 32 may be arranged on the driving engine. A multi-cylinder internal combustion engine 38 has a suction pipe 39 in which two throttle flaps are provided of which the flap 32 serves for regulating the admission of gas and the other 40 for regulating the admission of air. It is evidently also possible to make the control rods 30, 31 engage on the throttle flap 40 instead of on the throttle flap 32.

The present invention is not limited to the embodiments shown in the drawings and above described. Alterations and variations of the individual parts are evidently possible without departing from the essential idea of the invention. The configuration of piston 10, for instance, may be changed within reasonable limits. The piston, instead of being made of ceramic material, may consist simply of cast iron, as charcoal itself is a bad heat conductor. The material must merely be heat-proof.

What I do claim as my invention and desire to secure by Letters Patent is:

1. A grateless gas producer for producing gas for operating vehicles, comprising a shaft having a tapered lower portion forming the hearth for the production of the gas and terminating at the bottom into a throat portion for the removal of the produced gas and of ash, and a substantial and solid valvelike member movably connected with said gas producer and movable in the direction of the longitudinal axis of said throat portion, and having an upwardly tapered upper portion fitting into said throat portion and adapted to close same and to extend into the hearth upon upward movement of said member.

2. A grateless gas producer for producing gas for operating vehicles, comprising a shaft having a tapered lower portion forming the hearth for the production of the gas and terminating at the bottom into a throat portion for the removal of the produced gas and of ash, and a valvelike member movably connected with said gas producer and movable in the direction of the longitudinal axis of said throat portion, and having a substantially pear shaped configuration including an upwardly tapered upper portion fitting into said throat portion and adapted to close same and to extend into the hearth upon upward movement of said member.

3. A grateless gas producer producing gas for operating vehicles, comprising a shaft having a tapered lower portion forming the hearth for the production of the gas and terminating at the bottom into a throat portion for the removal of the produced gas and of ash, and a heat accumulating valvelike member movably connected with said gas producer and movable in the direction of the longitudinal axis of said throat portion and having an upwardly tapered upper portion fitting into said throat portion and adapted to close same and to extend into the hearth and to radiate heat to the solid fuel in the hearth upon upward movement and being outside of the hearth and in the hot gas stream and absorbing heat therefrom upon downward movement.

4. A grateless gas producer for vehicles producing gas from solid fuels and connected for gas flow with and operating a gas engine having power output control means, said gas producer comprising a shaft having a tapered lower end portion forming the hearth for the production of gas and terminating at the bottom into a throat portion for the removal of the produced gas and of ash, and a valve member having a tapered upper portion extending into said throat portion and said hearth and adapted to close said throat portion upon upward movement, said valve member being movable in the direction of the longitudinal axis of said throat portion and being movably connected with said gas producer and with said output control means and adapted to be simultaneously operated therewith.

5. A grateless gas producer for vehicles producing gas from solid fuels and connected for gas flow with and operating a gas engine having a speed governor, said gas producer comprising a shaft having a tapered lower end portion forming the hearth for the production of gas and terminating at the bottom into a throat portion for the removal of the produced gas and of ash, and a valvelike member having a tapered upper portion extending into said throat portion and said hearth and adapted to close said throat portion upon upward movement, said member being movable in the direction of the longitudinal axis of said throat portion and being movably connected with said gas producer and with said speed governor and adapted to be simultaneously operated therewith.

FRITZ HUBER.
KARL KÜNZEL.